United States Patent

[11] 3,576,143

[72] Inventor Stephen S. Baits
  Rockford, Ill.
[21] Appl. No. 855,495
[22] Filed Sept. 5, 1969
[45] Patented Apr. 27, 1971
[73] Assignee Sundstrand Corporation

[54] CONSTANT SPEED DRIVE AND GENERATOR
  20 Claims, 22 Drawing Figs.
[52] U.S. Cl. ................................................. 74/687
[51] Int. Cl. ........................................... F16h 47/04
[50] Field of Search ............................................ 74/687

[56] References Cited
UNITED STATES PATENTS
3,298,251  1/1967  Moss ........................... 74/687
3,365,981  1/1968  Gantzer ....................... 74/687
3,274,855  9/1966  Reynolds et al. ............. 74/687

Primary Examiner—Leonard H. Gerin
Attorney—Hofgren, Wegner, Allen, Stellman & McCord ABSTRACT: An integrated constant speed drive and generator for providing electrical power to aircraft including a constant speed drive housing open at one end and having drive components therein including a differential and an hydraulic drive, and a generator housing also open at one end and having a generator mounted therein with the housings interconnected so that they open to one another and define a common sump for generator cooling fluid as well as drive control and lubrication fluid, there being provided a single charge pump in the generator drive housing portion that provides hydraulic fluid for controlling the drive, lubricating the drive components, and cooling the generator rotor and stator by direct contact of the cooling fluid therewith.

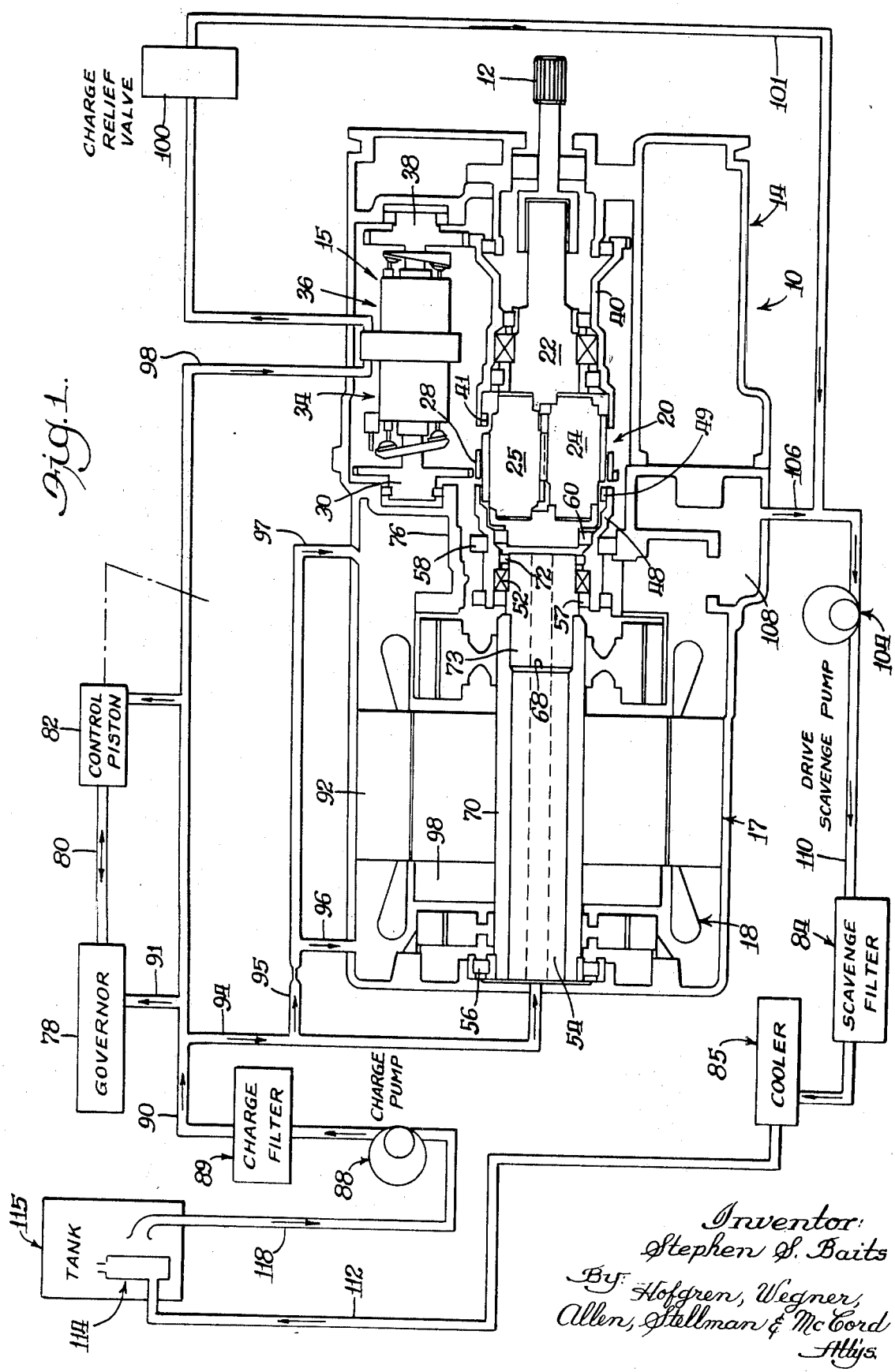

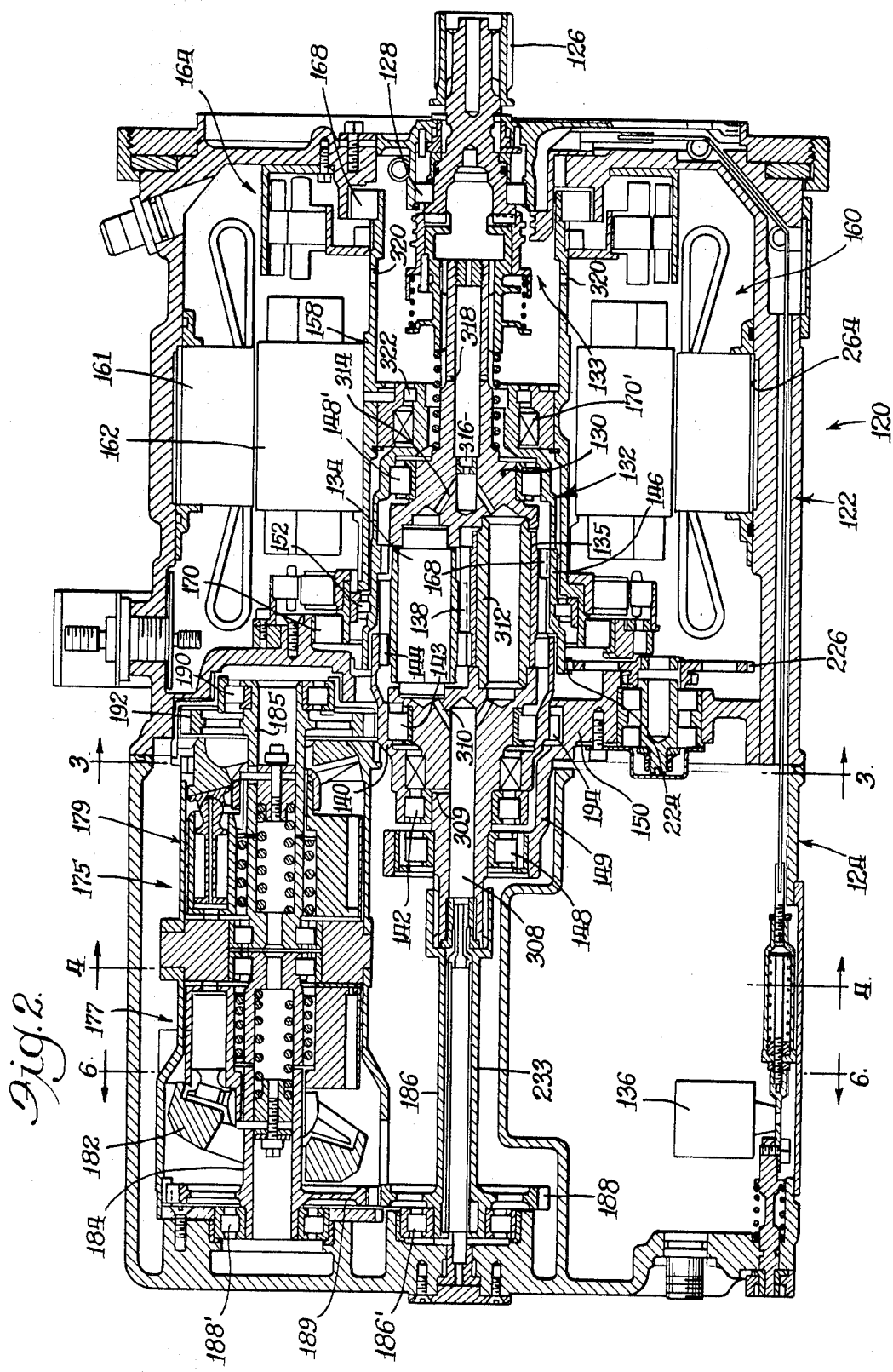

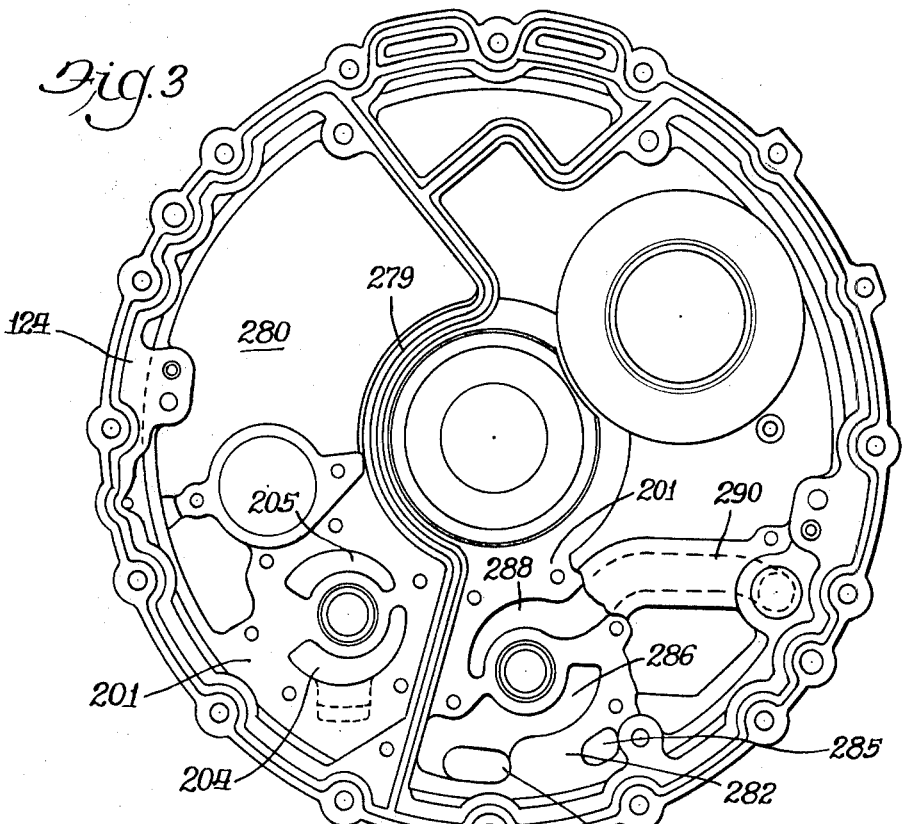
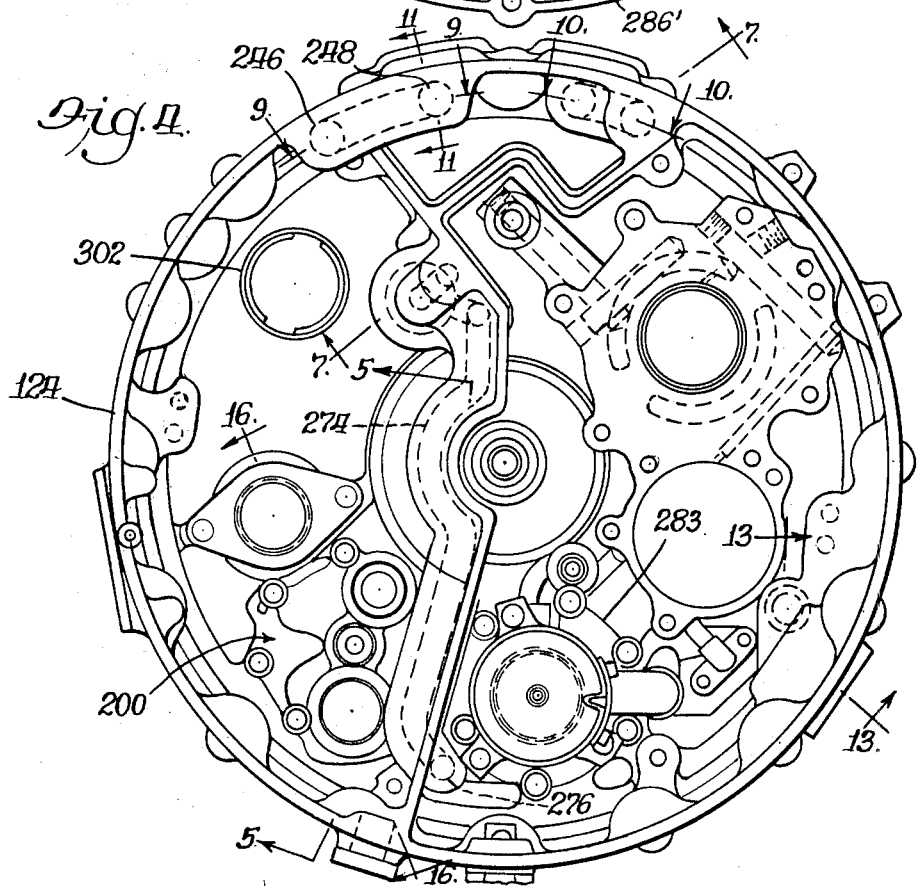

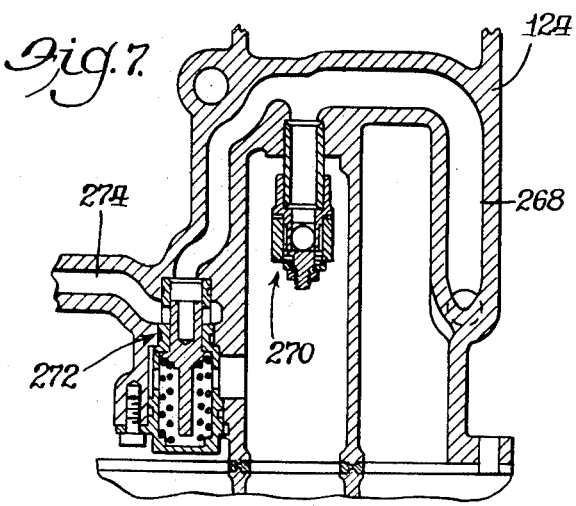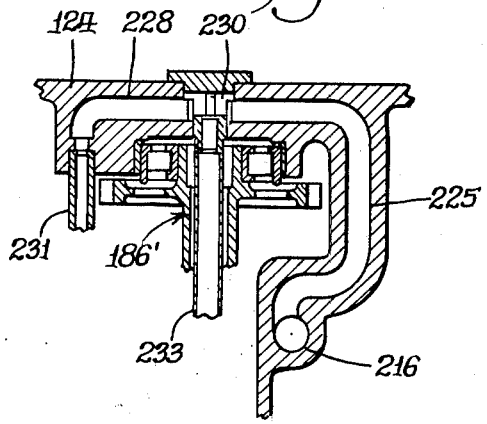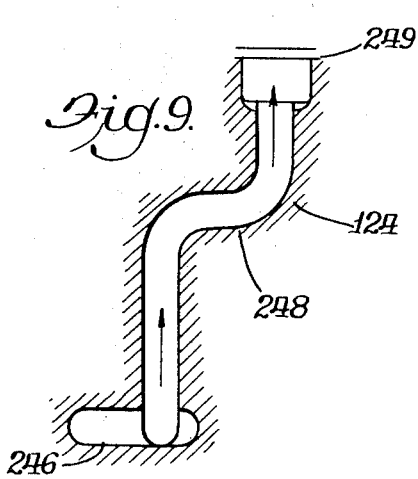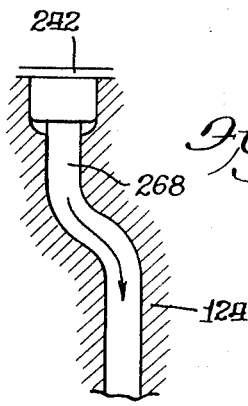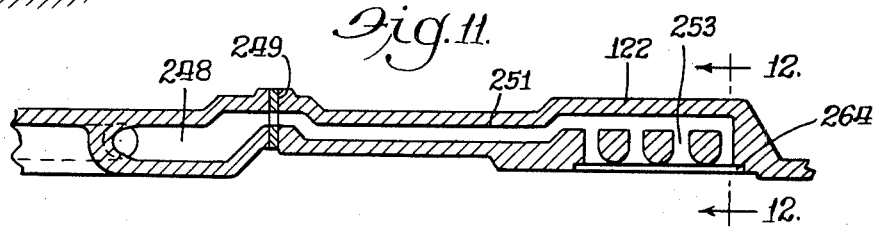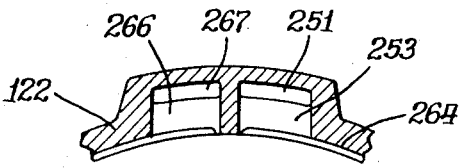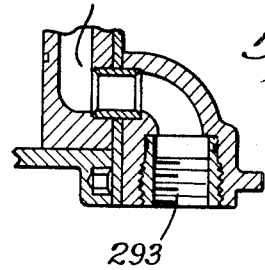

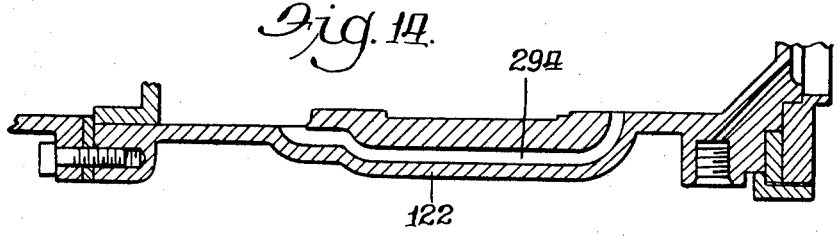
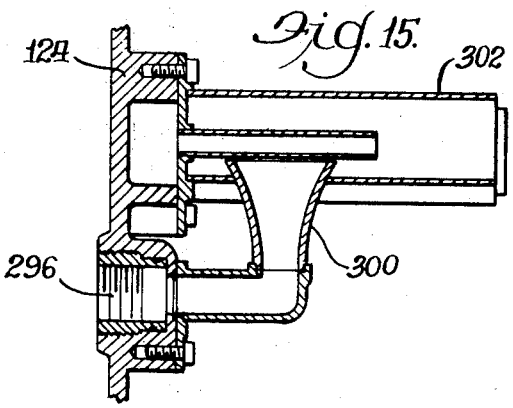
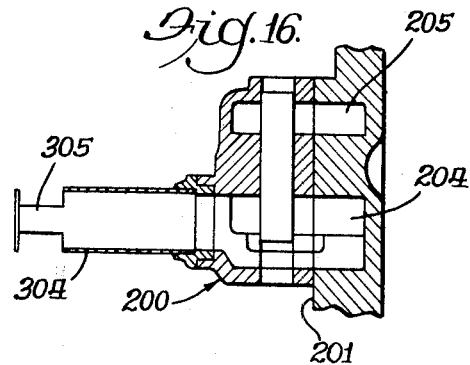
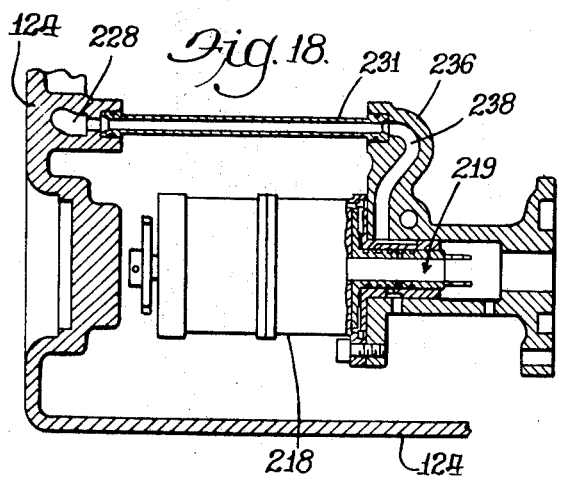
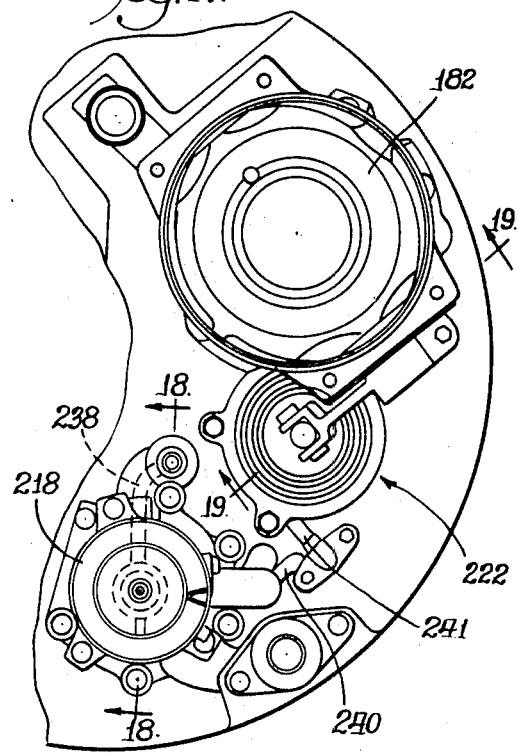
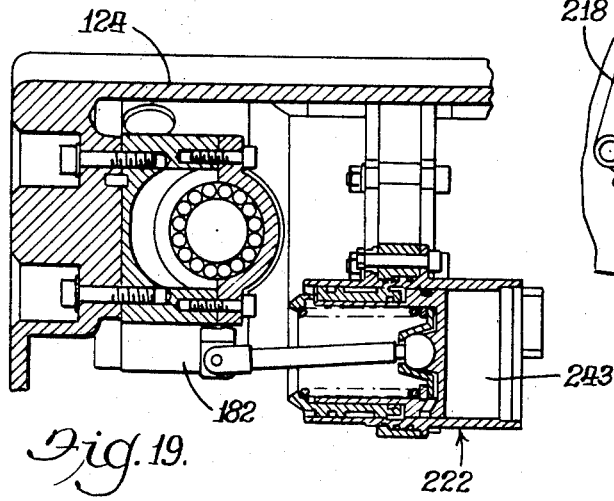

CONSTANT SPEED DRIVE AND GENERATOR

BACKGROUND OF THE PRESENT INVENTION

There have been provided in the past aircraft-engine-mounted constant-speed drives for the purpose of maintaining a constant-output shaft speed with variations in engine speed, for example from 4500 r.p.m. to 9000 r.p.m. Such a drive is shown in the U.S. Pat. of C. J. Gantzer, No. 3,365,981, assigned to the assignee of the present invention. Driven by these drives are generators in the 30 to 150 kv.-a. range which provide, for example, 400-cycle-per-second electricity for operation of aircraft equipment and accessories.

These two units, that is, the constant speed drive unit and the generator unit, have in the past usually been constructed as completely independent units by different manufacturers, fastened together for the purpose of mounting and driving only.

The constant speed drive units generally include a gear differential driven by the engine, positive displacement hydraulic pump and motor units for controlling the speed ratio of the differential gearing, and governor-operated control circuits for varying the displacement of the hydraulic units to achieve a constant speed output, as well as scavenge, lubrication and charge fluid circuits for these components. The constant speed drive housings have been sealed housings separate from the generator housing.

The generators commonly interconnected with these constant speed drives have also included independent sealed housings with stator and rotor completely supported and mounted therein. An independent lubrication circuit for bearings, seals, and splines has been provided when necessary. The rotor and stator are conventionally cooled by air.

It has been found desirable for the constant speed drives and generators to be improved by providing units of smaller size, lower weight and higher reliability. The constant speed drives themselves have a significantly higher reliability, i.e. the m.t.b.f. (mean time between failure) is far longer on the constant speed drives than on the generators themselves, and this divergence prompted the search which led to the design of the present integration of the constant speed drive and generator into a substantially common housing.

SUMMARY OF THE PRESENT INVENTION

In accordance with the present invention an improved constant speed drive and generator has been provided through the integration of the constant speed drive and generator into a common housing. While the drive housing may be physically separated in the sense that it is a separate part from the generator housing, the two housings freely communicate with one another and thus provide essentially one housing. Both housings are designed and communicate in such a way as to provide a common sump for the constant speed drive components as well as the generator components.

A charge pump is provided which draws cool fluid from a reservoir formed integrally within the constant speed drive portion of the housing to supply control fluid to the displacement and governing control circuit for controlling output shaft speed as well as providing lubrication for the differential gearing. In the present integrated drive, however, the charge pump also serves to provide cooling fluid, through suitable passages integrally formed in the housings, directly in contact with the generator stator for the purpose of cooling the generator.

The charge pump also supplies cooling fluid through a suitable passage coaxial with the rotor for direct contact cooling of the rotor itself.

There are several advantages to this arrangement over the prior constant speed drive and separate generator units. Firstly, the sealed wall between the constant speed drive and generator has been eliminated as well as the necessity of rotating contact-type seals at the mating ends of the generator and constant speed drives presently in use. An additional benefit to the generator is that a common environment is provided with the drive components which is more favorable than being open to the atmosphere as in prior air-cooled generators. The spline life in the generator is also increased due to its being continuously lubricated by fluid from the single charge pump located in the drive housing. If desired, a single set of pumps can be provided for the scavenge, charge, cooling and lubrication functions for both drive and generator which may be more conveniently located in the constant speed drive portion of the housing resulting in space and weight savings since they are more easily driven from this location and their number is reduced.

A further feature of the present invention is that one of the differential elements is in line and directly connected with the generator rotor and rotates at the same speed therewith eliminating the need for intermeshing gears between the differential and the generator. An ancillary feature to this is that the entire differential is aligned with the generator axis as well as the input shaft so that additional gearing between the input shaft and the differential is eliminated.

A still further feature of the present invention is in the provision of, in one embodiment, two hydraulic drives in parallel controlled by a single governor which reduces the maximum diameter of the integrated constant speed drive and differential.

Moreover, it is possible for generators to operate at as much as 150 percent of their rated load continuously without damage whereas in conventional air-cooled generators such overloads can be tolerated only for a few minutes.

BRIEF DESCRIPTION OF THE DRAWINGS

FIG. 1 is a schematic view of one embodiment of the present invention;

FIG. 2 is a longitudinal cross section of an integrated drive and generator generally similar to the one shown in FIG. 1;

FIG. 3 is a cross section taken generally along line 3-3 of FIG. 2, showing the charge pump and scavenge pump mounting surfaces and ports;

FIG. 4 is a cross section taken generally along line 4-4 of FIG. 2, showing the charge pump and scavenge pump mounted in position along with the control governor;

FIG. 7 is a fragmentary section taken generally along line 7-7 of FIG. 4;

FIG. 8 is a fragmentary section taken generally along line 8-8 of FIG. 6;

FIG. 9 is a fragmentary section taken generally along line 9-9 of FIG. 4, showing the inlet passage for stator cooling fluid;

FIG. 10 is a fragmentary section taken generally along line 10-10 of FIG. 4, showing the return passage for stator cooling fluid;

FIG. 11 is a fragmentary section taken generally along line 11-11 of FIG. 4, showing the stator cooling fluid passages;

FIG. 12 is a fragmentary section taken generally along line 12-12 of FIG. 11;

FIG. 13 is a fragmentary section taken generally along line 13-13 of FIG. 4;

FIG. 14 is a fragmentary section showing the generator housing sump;

FIG. 15 is a fragmentary section taken generally along line 15-15 of FIG. 6, showing the inlet reservoir swirl chamber;

FIG. 16 is a fragmentary section taken generally along line 16-16 in FIG. 4 showing the charge pump;

FIG. 17 is a fragmentary section of the FIG. 4 section;

FIG. 18 is a fragmentary section taken generally along line 18-18 of FIG. 17 showing the transmission displacement control governor;

FIG. 19 is a fragmentary section taken generally along line 19-19 of FIG. 17 showing the hydraulic unit displacement control motor;

DETAILED DESCRIPTION OF THE PREFERRED EMBODIMENTS

Figure 5:
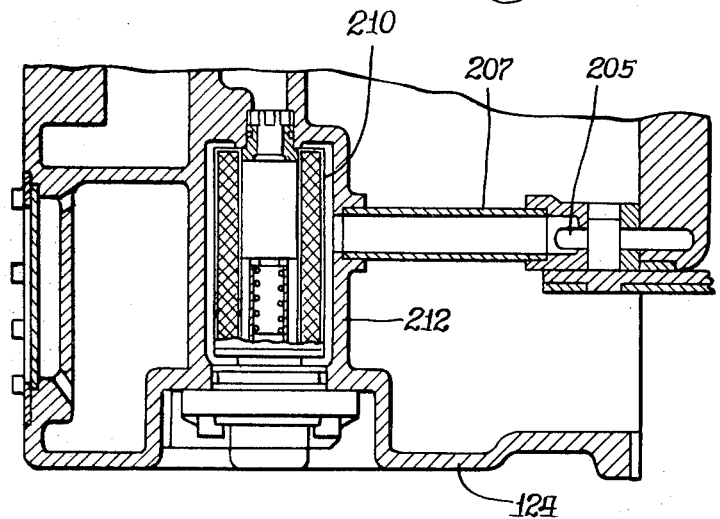
FIG. 5 is a fragmentary section taken generally along line 5-5 of FIG. 4, showing the charge pump filter.

Referring to the drawings and particularly the embodiment shown in FIG. 1, an integrated constant speed drive and generator 10 is shown with its associated hydraulic circuit, some parts of which are enclosed within the housing for the unit and some of which are not as will appear hereinafter. The integrated constant speed drive 10 is adapted to be mounted on the engine gear box of the associated aircraft engine with the input shaft 12 driven in rotation by the engine through the gear box. It should be understood that shaft 12 may vary in speed with the engine and thus, in contemporary aircraft design and gear box configuration, may vary in speed from zero to 9,000 r.p.m. during normal use. The integrated drive differential 10, however, is designed in one actual construction to provide a constant generator speed, or constant output shaft speed e.g. 12,000 r.p.m. for input shaft speeds of shaft 12 of between, for example, 4,500 to 9,000 r.p.m. which is sufficient to include normal engine speed ranges.

The integrated drive and generator 10 is seen to include generally a drive housing 14 with an hydraulic drive 15 therein and a generator housing 17 with a generator 18 therein connected to the drive housing 14 with a differential 20 mounted partially within each of the housings 14 and 17.

Input shaft 12 is coaxial with and drivingly connected to differential gear carrier 22 which rotatably carries intermeshing pinions 24 and 25. The gear carrier 22 also has a ring 28 mounted for rotation therewith which has a gear thereon meshing with gear 30 connected to a variable displacement axial piston hydraulic unit 34.

The hydraulic unit 34 is hydraulically interconnected through suitable conduits (not shown in FIG. 1) in fixed displacement hydraulic unit 36 which is also of the axial piston type. The hydraulic unit 36 is drivingly connected through gear 38 with a stepped sleeve ring gear 40 having internal teeth as at 41 interengaging pinion 24.

The differential 20 also includes another sleeve-type ring gear 48 with internal teeth 49 thereon intermeshing with pinion 25 and driven thereby in rotation. The above described components define generally what is termed in the art an output differential. With carrier 22 serving as the input and the sleeve ring gear 48 functioning as the output, the hydraulic drive 15 is suitably varied to control the speed of control sleeve ring gear 40 to provide a constant output speed of output ring gear 48.

Output ring gear 48 is connected through a suitable overrunning clutch 52 to drive generator rotor 54.

The generator rotor 54 is supported at its left end in housing 17 by bearings 56 and at its right end by output sleeve bearings 57 and 58 through bearing 72 between the sleeve 48 and an intermediate shaft 73. Intermediate shaft 73 rotates with shaft 54 due to the interconnecting function of rotor sleeve 70, which is suitably fixed to both shaft 54 and shaft 73.

That is, the output sleeve is supported in housing portion 76, the shaft 73 is supported within the output sleeve 48 and the rotor shaft 54 is fixed to rotate with the shaft 73 with the sleeve 70 maintaining alignment therebetween.

In operation, governor 78 which is responsive to the speed of output sleeve 48, delivers control fluid through passage 80 to a control piston 82 which varies the displacement of hydraulic unit 34 to control the speed ratio between carrier 22 and output 48 to maintain a constant speed of rotor shaft 54 as input speed of shaft 12 varies thus producing a constant frequency signal from generator 18.

The hydraulic system of the drive and generator 10 shown in FIG. 1 is illustrated in purely schematic form and it should be understood that all of the components and passages shown are actually within the housings 14 and 17 with the exception of scavenge filter 84 and scavenge fluid cooler 85.

The lubrication system shown is for the purpose of providing lubricating fluid to the drive and generator components, control fluid to the control circuit for varying transmission drive ratio and for providing cooling fluid to the generator 18. Toward this end a charge pump 88 is provided which supplies fluid through a charge filter 89 to governor 78 through passages 90 and 91. Cooling fluid is provided for the stator 92 of generator 18 through passages 94, 95, 96 and 97. For lubricating, the differential gearing 20 as well as the generator splines, rotor shaft 54 is hollow and communicates with passage 94 so that fluid is delivered through the rotor to lubricate the various gear elements in the differential as well as several of the generator parts. Moreover, suitable means, not shown in FIG. 1, may be provided for the purpose of cooling the rotor 98 with the generator. It should be understood that the cooling of the generator rotor and stator is by direct contact with cool hydraulic fluid supplied through passage 94.

Makeup fluid is supplied to the hydraulic drive 15 through passage 98 and the excess capacity of charge pump 88 is delivered over charge relief valve 100 through passage 101 to the inlet of a scavenge or sump pump 104. The scavenge pump draws fluid through passage 106 from a common sump 108 which communicates with both housings 14 and 17 so that sump 108 collects fluid from the components in both housings. Scavenge pump 104 delivers fluid through passage 110, through the scavenge filter 84 and cooler 85, through passage 112 to a swirl chamber 114 in a reservoir 115 which is defined by a suitable partition in the housing 14 separating it from the common sump 108. Passage 118 conveys fluid from the reservoir tank 115 to the inlet of charge pump 88.

The embodiment of the present invention shown in FIGS. 2 to 19 is substantially the same as the schematic illustration of FIG. 1 with the exception that the input shaft projects from the generator end of the integrated housing rather than the constant speed drive end thereof. Viewing initially the longitudinal, sectional view in FIG. 2 a constant speed drive and generator combination 120 is shown which is seen to include a generally cylindrical generator housing 122 having its left end open and a generally cylindrical drive housing 124 having its right end open. The housing members 122 and 124 are fixed together by suitable fasteners (not shown). An externally splined input shaft 126 is seated in bearing 128 and projects centrally from the generator housing 122. The input shaft 126 like shaft 12 in the FIG. 1 construction, is adapted to be driven by one of the aircraft engines through a suitable gear box. The input shaft drives a gear carrier 130 of gear differential 132 through a quick disconnect coupling 133. The quick disconnect coupling 133 may be actuated by solenoid 136 disconnecting the engine from the drive 120. The construction and the operation of the quick disconnect 133 is shown and described in more detail in the Gantzer U.S. Pat. No. 3,365,981 and reference should be made thereto for more complete description thereof.

The elongated pinion carrier 130 rotatably receives elongated pinions 134 and 135 which intermesh centrally as shown at 138. A stepped sleevelike control ring gear 140 is provided rotatably supported on the elongated gear carrier 130 by bearings 142 and 143. Ring teeth 144 are formed on the right end of sleeve gear 140 integrally therewith and intermeshing with pinion 134 on the left end of the gear teeth thereof. The left end of the elongated gear carrier 130 is supported in bearing 148 mounted in a bearing frame boss 149 integral with an apertured support and dividing partition 150 formed on the housing member 124.

A stepped output sleeve gear 146 is coaxially disposed with respect to the input shaft 126 as well as the control sleeve gear 140, and rotatively supports the gear carrier 130 by bearing 148' as well as being externally supported by bearings 152 and 322 reacting against generator shaft 158.

The entire differential is coaxially aligned with the input shaft 126 and is seen to be partially disposed or located within generator rotor shaft 158. Generator 160 is seen to include a stator coil 161 mounted fixedly in housing 122 and a rotatable rotor 162 fixed to shaft 158. There is also provided suitable exciter windings 164 known to be conventional part of AC generators. The right end of hollow rotor shaft 158 is rotatably mounted in bearing 168 seated within a suitable boss in the end portion of housing member 122. The left end of hollow rotor shaft 158 is supported in bearing 170 carried and in turn supported by the main partition member 150. Thus, it may be seen that the right end of the differential is in effect supported within the hollow generator rotor shaft 158.

The generator or rotor 162 is driven by direct connection with the output sleeve gear 146, which has internal teeth 168 meshing with the gear teeth at the right end of pinion 135, through overrunning clutch 170' approximately centrally located in the rotor shaft 158 with respect to the rotor 162.

In a fashion similar to FIG. 1 construction, by suitably controlling the speed of control gear 140 with respect to the speed of the input shaft 126 and carrier 130, the desired constant output speed of output ring gear 146 and rotor 162 may be achieved.

For the purpose of controlling the speed of sleeve ring gear 140 a variable displacement hydraulic drive 175 is provided including a variable displacement axial piston hydraulic unit 177 and a fixed displacement axial piston hydraulic unit 179. For a more complete description of the details of these hydraulic units reference should be made to the Gantzer U.S. Pat. No. 3,365,981 which shows hydraulic units of similar construction. Suffice it to state that by pivoting cam 182 the displacement of the hydraulic drive 175 may be varied as desired to achieve infinite variations in the relative speeds of shafts 184 and 185 drivingly connected respectively to hydraulic units 177 and 179. The units 177 and 179 will at times act as pumps and at other times act as motors or metering devices.

The hydraulic unit 177 is driven by the input shaft 126 through gear carrier 130 and a hollow shaft 186 splined to the left end of gear carrier 130 and rotatably supported at its left end by bearing 186' in the closed end of housing member 124. The shaft 186 has a gear 188 integrally formed thereon and intermeshing with gear 189 formed integrally with hydraulic unit shaft 184. The hydraulic drive 175 is supported in housing member 124 by bearing 188' which supports shaft 184 and by bearing 190 which supports shaft 185. Formed integrally with shaft 185 is a gear 192 which intermeshes with an external gear 194 formed integrally with control sleeve gear 140 of the differential for the purpose of controlling the speed and direction of rotation of the control gear.

By suitably controlling the direction and extent of displacement of the cam 182 from its neutral or zero stroke position the control gear 140 may be rotated in either direction of rotation at speeds sufficient to maintain a constant output shaft speed from output sleeve gear 146 and consequently the rotor 162 which is driven in rotation thereby.

Figure 6:
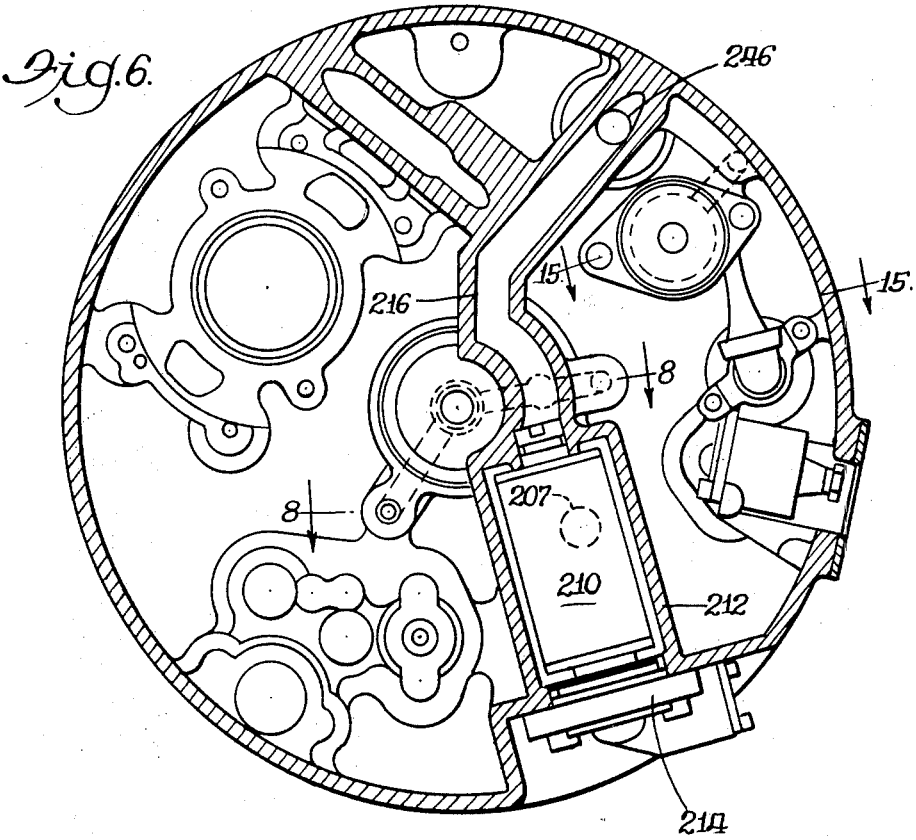
FIG. 6 is a cross section taken generally along line 6-6 of FIG. 2, showing several of the charge pump passages.

Viewing FIG. 4 a charge pump 200 is provided for supplying charge control and lubricating fluid to the constant speed drive as well as cooling and lubricating fluid to the generator 160. The charge pump is supported on a mounting plate 201 (FIG. 3) formed integrally with housing member 124 and extending generally transversely thereto in a plane adjacent the partition 150. Mounting plate 201 has an arcuate inlet port 204 and an arcuate outlet port 205. It should be understood that the charge pump 200 is removed from the view shown in FIG. 3. The charge pump 200 supplies fluid under pressure through outlet port 205 and a tube 207 (FIG. 5) longitudinally rearwardly in housing 124 as viewed in FIG. 2 to a charge pump filter 210 seated within a boss 212 formed within the housing 124 and extending generally radially with respect thereto as shown in FIG. 6. The charge filter 21 may be removed by removal of fitting 214. After passing through the charge filter 210 charge fluid is supplied to an irregular passage 216 extending transversely near the end of housing member 124 and formed integrally with the housing.

As may be seen in FIG. 18 a governor 218 is provided mounted within housing portion 124 and extending longitudinally adjacent the closed end thereof. Governor 218 includes a rotating sleeve 219 and ports fluid selectively to a displacement control 222 shown in FIG. 19. The displacement control 222 controls the position of hydraulic unit cam 182 and thus varies the displacement and drive ratio of the fluid drive 175. Governor 218 is driven by the output sleeve gear 146 through gear 224 formed on the periphery thereof which interengages the idler gear 226 and this gear in turn drives gearing (not shown) which is drivingly connected to the rotating sleeve 219 in governor 218 for the purpose of rotating the same at a speed proportional to the speed of generator rotor 162.

Viewing FIG. 8 control fluid is supplied from the charge pump to the sleeve 219 through passage 216 extending from the charge filter 210, through passage 225 intersecting and extending perpendicular to passage 216. Passage 225 is formed integrally with the end of housing 124 in a plane extending radially through the axis of shaft 186. Charge fluid in passage 225 communicates with a similar opposed passage 228 across a slotted fitting 230 which serves to retain a feed tube 233 in position within shaft 186. Passage 228 is also formed integrally with the housing 124 and communicates with a longitudinally extending tube 231 projecting from the end of the housing member 124 and extending toward the generator. As seen in FIG. 18 the tube 231 is fitted within a valve housing 236 which defines a passage 238 communicating with the tube 231 for the purpose of supplying control fluid to the sleeve 219.

The governor 218 has a valve (not shown) which shifts axially in response to the speed of governor 218 and the speed of sleeve gear 146 to selectively port fluid through passage 240 and 241 (FIG. 17) to the displacement control 222 and more particularly to chamber 243 (FIG. 19) of the displacement control.

For the purpose of cooling the stator 161 of generator 160 charge fluid in passage 216 is conveyed to a generally axially extending passage 246 (FIGS. 4 and 6) formed integrally in the housing periphery 124. As may be seen in FIGS. 9 and 11 passage 246 communicates with passage 248 extending generally axially in drive housing member 124 and to the open end 249 thereof. Passage 248 also appears in dotted lines in FIG. 4. The charge fluid in passage 248, which is in fact cooling fluid for the generator stator, passes across the interface of the housing members 124 and 122 into passage 251 extending axially in the generator housing 122 as may be seen in FIG. 11. Passage 251 communicates through radial passages 253 in housing member 122 with an arcuate recess 264 (see also FIGS. 2 and 12) which extends almost 360° within the housing member 122 adjacent and aligned with the stator 161.

Fluid flowing in recess 264 is in direct contact with the stator 161 and cools the stator as it flows around the same and exits through radial passages 266 as seen in FIG. 12, similar in construction to radial passages 253. The cooling fluid exits in the opposite direction through axially extending passage 267 also formed integrally in housing member 122 back toward the interface 242 between the drive and the generator housings. As may be seen in FIG. 10 the exiting stator cooling fluid from the generator housing 122 enters the drive housing 124 through passage 268 and passes rearwardly through the drive housing to a system pressure makeup valve 270 shown in FIG. 7. The valve 270 serves to port fluid to the low pressure side of the hydraulic circuit (not shown) interconnecting the hydraulic units 177 and 179.

The excess hydraulic fluid supplied by the charge pump 200 for the entire hydraulic circuit is relieved over a charge pressure relief valve 272 shown in FIG. 7 through passage 174 extending transversely in drive housing 124 as may be seen in FIG. 7, to the other side of the drive housing where it opens as shown at 276 in FIG. 4 into a common sump which collects leakage and excess fluid for both the components in drive housing 124 and generator housing 122.

It should be understood from viewing FIGS. 3 and 4 that a partition 279 is provided in drive housing 124 dividing the drive housing into a reservoir or tank 280 hydraulically sealed from a common sump 282 for both generator and drive housing 122 and 124 respectively. The partition 279 extends up to the mounting plate 201 which also defines mounting plate for scavenge pump 283 as shown in FIG. 4. Apertures such as 285 and 286' in the mounting plate 201 provide sump communication between the drive housing and the generator housing. It should be understood that mounting plate 201, as noted above is formed with the partition 150 between the generator and drive housings. As shown in FIG. 3, the scavenge pump 283 has an inlet port 286 communicating with the sump 282 freely, and an outlet port 288, both formed in the mounting plate 201. The scavenge pump 283 serves to draw fluid from the common sump in the housings and to deliver fluid outside the housings through a suitable scavenge filter and cooler (not shown in FIGS. 2 to 19) and to return fluid to the reservoir 280. As shown in FIG. 14, defined within the generator housing 122 is a generator portion 294 of sump 282 that freely communicates with the interior of the generator housing and the inlet of the scavenge pump 283 through ports 285 and 286' shown in FIG. 4. The generator sump portion 294 collects excess cooling fluid from the generator as well as lubrication fluid leakage from the bearings within the generator housing.

The outlet 288 of the scavenge pump 283 delivers fluid to passage 290 as seen in FIG. 3 to a scavenge fluid housing outlet 293 shown in FIG. 13.

Suitable conduits, (not shown in FIGS. 2 to 19) are provided connected to port 293 to convey the fluid to a cooler and through a scavenge filter such as shown at 84 and 85 in the FIG. 1 construction, and back to an inlet port 296 formed in the end of the drive housing 124 as shown in FIG. 15. Hydraulic fluid entering the port 296 passes through a flared inlet 300 into a conventional swirl chamber 302. From the swirl chamber 302 the filtered and cooled hydraulic fluid flows directly into the reservoir or tank 280. As seen in FIG. 16 the charge pump 200 has an inlet tube 304 which opens as the at 305 directly into the reservoir 280 so that it draws cooled and filtered hydraulic fluid therefrom.

The charge pump 200 also delivers charge fluid for the purpose of lubricating the gearing in the drive as well as for cooling the rotor 162 of the generator by direct contact. Toward this end, a portion of the charge fluid flowing in passage 225 as shown in FIG. 8 enters feed tube 233 mounted centrally within the drive housing 124 and flows therefrom through an axial passage 308 in the gear carrier 130 as shown in FIG. 2. A portion of this fluid flows radially outwardly of the carrier to lubricate the adjacent bearings such as bearings 142, 143 and 148.

From passage 308 charge and cooling fluid flows through diagonal passages 310 into hollow sleeves 312 supporting the differential pinions 134 and 135. A portion of this fluid leaks between the carrier and the ends of the pinions for the purpose of lubricating the pinions. After passing through the sleeves 312 fluid flows through passages 314 on the other end of the differential pinions and from there into an axial passage 316 also formed in the carrier.

Radial passages 318 are formed in carrier 130 communicating with axial passage 316 permitting the outward flow of fluid to within the rotor sleeve 158. This fluid is thrown outwardly by centrifugal force and passes through passages 320 in the rotor sleeve 158 and from there into direct contact with the rotor 162. Suitable additional means may be provided for directing the cooling flow from passages or ports 320 into direct contact with the rotor 162. Fluid from passages 318 may also be used for lubricating bearing 322 as shown in FIG. 2.

Figure 20:
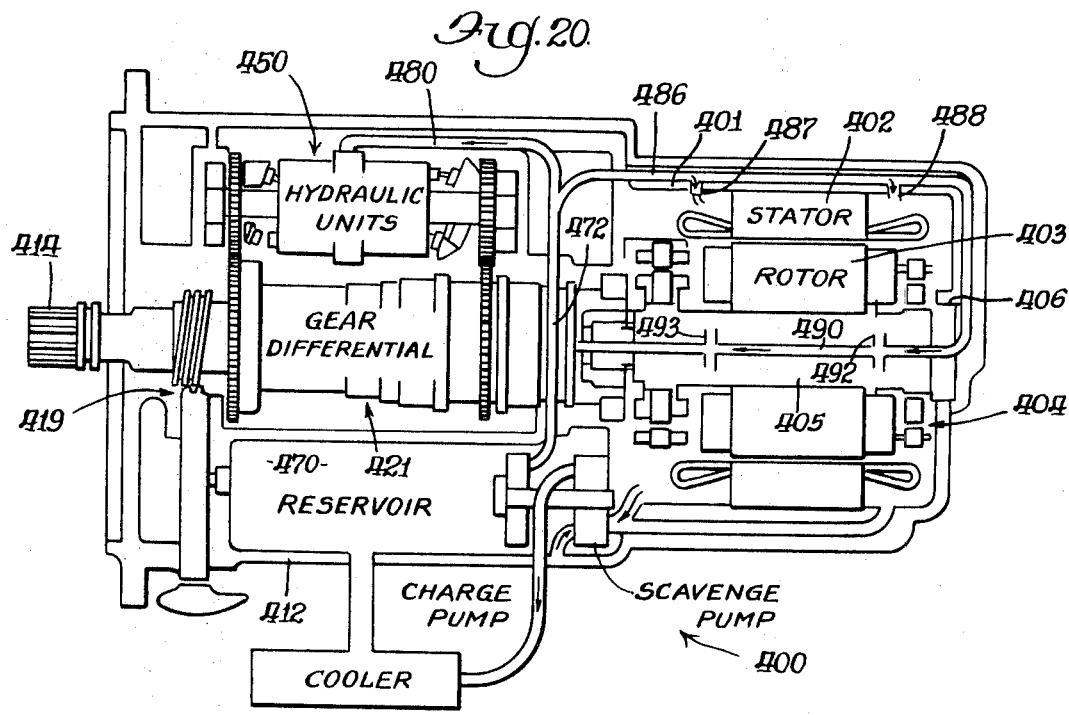
FIG. 20 is a schematic illustration of another embodiment of the present invention.
Figure 21:
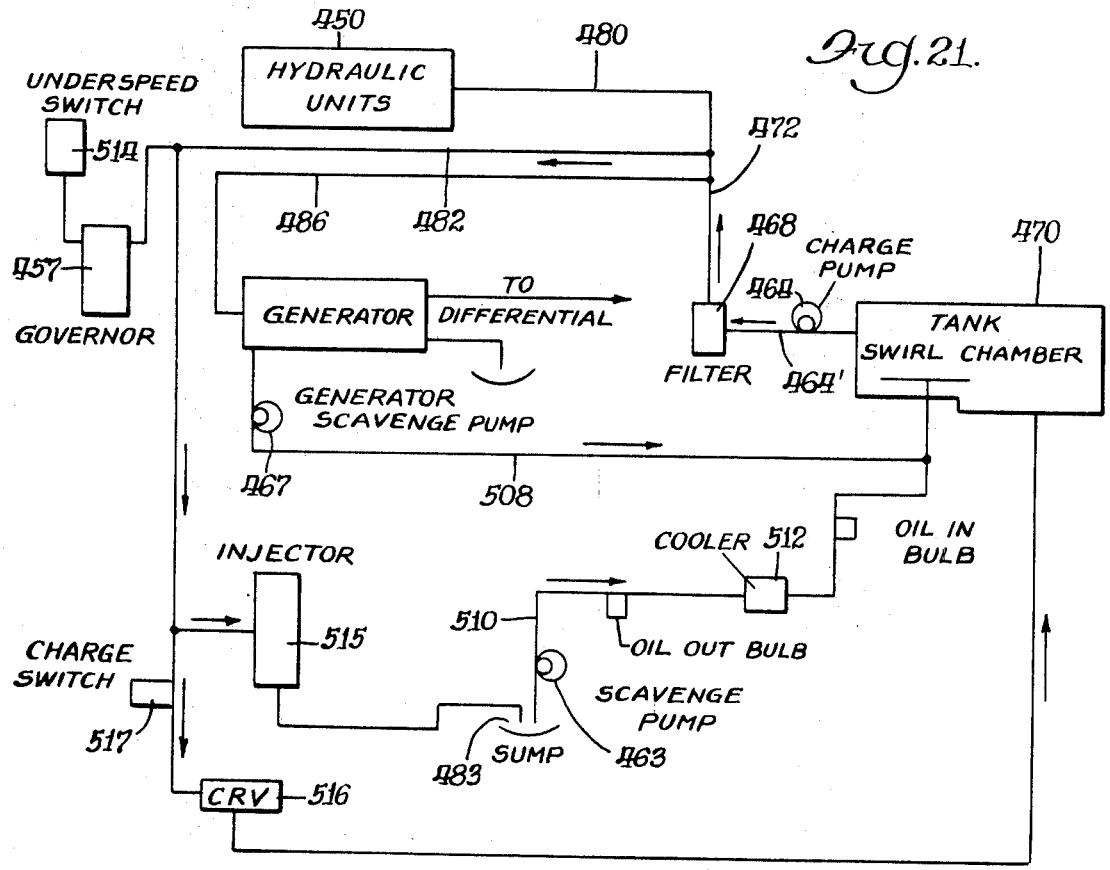
FIG. 21 is an hydraulic circuit schematic for the integrated constant speed drive and generator shown in FIG. 20.
Figure 22:
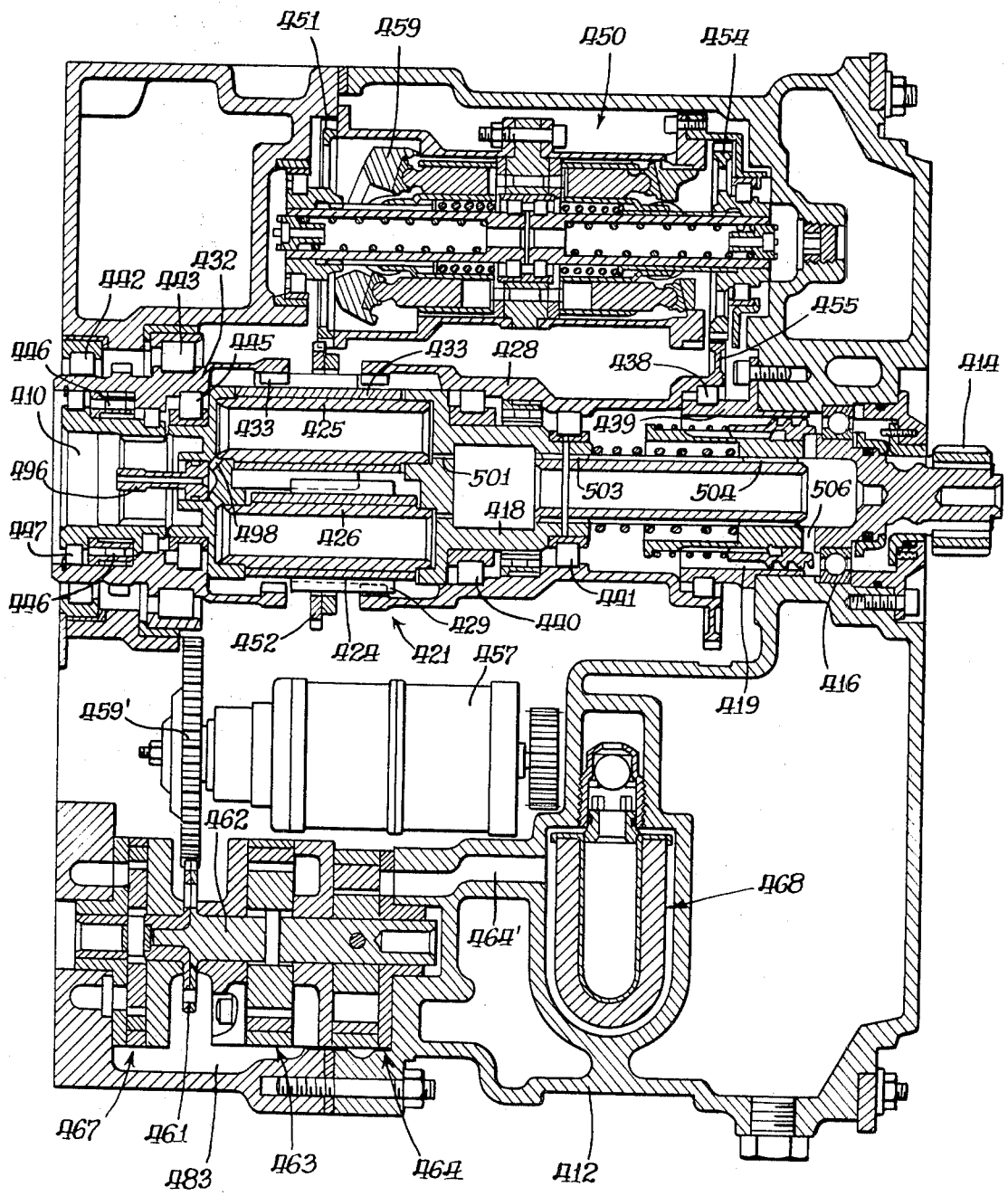
FIG. 22 is a longitudinal section of the drive portion of the embodiment shown in FIG. 20.

An alternative integrated constant speed drive and generator 400 is shown in FIGS. 20 to 22. This drive and generator combination is similar to that disclosed in FIG. 1, and generally similar to that disclosed in FIGS. 2 to 19 with the primary exception that the differential pinion gears are not located partially within the generator rotor sleeve. This reduces rotor size somewhat and decreases centrifugal forces on the rotor. An additional difference from the FIGS. 2 to 19 construction is that the cooling fluid for the rotor and the lubricating fluid for the differential gearing flows from the generator housing to the drive housing rather than vice versa.

Viewing FIG. 20 the drive and generator 400 is seen to include a generator housing 401 enclosing a stationary generator stator 402 and a rotatable rotor 403 as well as an exciter assembly 404. The right end of rotor shaft 405 is supported in a bearing 406 in generator housing 401 and the left end of rotor shaft 405 is supported within a splined sleeve 410 shown in FIG. 22 which is driven by the output of the constant speed drive.

Fixed to the generator housing 401 is a drive housing 412 which is shown reversed in FIG. 22 with respect to the view in FIG. 20. The drive housing 412 supports an input shaft 414, adapted to be connected to the engine, in bearing 416. The input shaft 414 is connected to drive an elongated gear carrier 418 through a quick disconnect coupling 419. The gear carrier 418 forms part of an elongated differential 421 of similar construction to the above described embodiments.

More particularly, differential 421 includes two pinion gears 423 and 424 rotatably mounted on sleeves 425 and 426, respectively, in turn mounted in the elongated gear carrier 418. A stepped control ring gear 428 has internal ring teeth 429 engaging the teeth on gear 424 and an output sleeve ring gear 432 has internal ring gear teeth 433 drivingly engaging pinion 423. As with the other embodiments by suitably controlling the speed and direction of control gear 428 a constant output speed may be achieved from the output 432.

The differential is supported in its right end (as viewed in FIG. 22) by bearing 438 mounted on a bearing flange 439 fixed to the right end of the drive housing 412. Carrier 418 is supported in the control gear 428 by bearings 440 and 441.

The left end of the differential 421 is supported in bearings 442 and 443 mounted centrally in the left end of housing 412 as seen in FIG. 22, which support the output sleeve gear 432. The left end of differential gear carrier 418 is supported in the output ring gear 432 by bearing 445. The internally splined generator coupling sleeve 410 is connected to the output sleeve gear 432 by an overrunning clutch 446 in addition to a bearing 447.

It should be understood that the input shaft 414 and the differential 421 are supported with the drive housing. Also supported within the drive housing are two hydraulic drives 450 (only one shown in the drawings) similar in construction to the hydraulic drive 175 shown in FIG. 2. The provision of two hydraulic drives 450 decreases the required diameter of the drive housing 412. Suffice it to state that one end of each of the drives as shown in FIG. 22 is connected through gear 451 and gear 452 to the gear carrier 418, while the other end of each of the drives is connected through gear 454 and gear 455 to the control gear 428. By varying the direction and extent of displacement of cam 459 the speed and direction of control gear 428 can be varied and a constant output speed may be achieved from output gear 432.

It should be understood that the input shaft 414 and the differential 421 are coaxially disposed with respect to the housing 412 as well as the housing 401 for the generator in a fashion similar to the embodiments described above even though they appear offset in FIG. 22 because of this being an irregular sectional view.

For the purpose of maintaining a constant output speed a control governor 457 (see also FIG. 21) is provided which is driven by the output ring gear 432 through gear 459'.

Governor 457 selectively ports fluid to a control motor which varies the displacement of cam 459 to achieve a constant speed of the generator rotor 403.

The gear 459', driven by the output, also drives gear 461 integrally formed with shaft 462 which in turn drives both a scavenge pump 463 and a charge pump 464 both coaxially mounted in the drive housing 412.

In addition to scavenge pump 463, a generator scavenge pump 467 is provided in the drive housing 412 for the purpose of scavenging the generator housing 401.

The drive housing 412 has a separate reservoir 470 (FIGS. 20 and 21) therein which communicates with the inlet of charge pump 264 for supplying filtered and cooled fluid thereto.

Charge pump 464 delivers fluid through a rearwardly and axially extending passage 464' in housing 412 to a charge fluid filter 468 (FIGS. 21 and 22).

From the charge filter fluid flows through passage 472 (FIG. 21) to the hydraulic drives 450 through passage 480 for the purpose of supplying makeup fluid to the working conduits of the hydraulic drive 450. Moreover, charge fluid is supplied through line 482 to the governor 457 with the excess charge fluid being delivered back to a sump 483 within the drive housing.

For the purpose of cooling the generator and lubricating the differential, fluid from line 472 flows through line 486 to nozzles 487 and 488 which spray cooling fluid in direct contact with stator 402.

Fluid in passage 486 also passes down the end of the generator housing and into a central passage 490 (FIG. 20) centrally disposed in the generator rotor shaft 405. Radial passages 492 and 493 in the generator rotor 405 serve to spray cooling fluid on the rotor 403 of the generator for direct contact cooling thereof.

The remaining fluid in passage 490 passes through the end of the rotor shaft 405 and into an interfitting tube 496 shown in FIG. 22 seated within the gear carrier 418. This tube has limited leakage to lubricate the spline and coupling 419 and the remainder passes through the central passage therein, through diagonal ports 498 to the interiors of the pinion sleeves 425 and 426. A portion of the fluid therein leaks out to lubricate the pinion gears and the remaining portion passes through passages 501 in the gear carrier 418 on the other side of the pinions. Some of this fluid leaks along splines 503 and 504 for the purpose of lubricating the same and the remainder passes out radial passages 506 in the input assembly of shaft 414 into the drive sump 483.

The generator scavenge pump 467 conveys fluid through line 508 to the reservoir 470 in housing 412 (shown in FIG. 21). The drive scavenge pump 463 conveys fluid through passage 510 out of the drive housing through a cooler 512. From the cooler 512 cool fluid is returned to the drive housing 412 and into the tank 470 through the swirl chamber.

A suitable underspeed switch 514 may be provided as shown in FIG. 21 associated with governor 457 for the purpose of disconnecting the generator outputs from the other generators on the craft at a predetermined abnormal underspeed. An injector 515 is provided for pressurizing the drive and generator housing, and a charge relief valve 516 ports excess charge fluid directly back to the reservoir or tank 470. If desired, a charge pressure switch 517 may be provided for remote indication of the charge pressure level.

I claim:

1. A drive and generator combination, comprising: a generator having a stationary stator and a rotor adapted to be driven at a substantially constant speed, a constant speed drive for driving the rotor including an input shaft member adapted to be driven by a prime mover, an output shaft member connected to drive the rotor, differential gearing between the input and output shaft members including a control gear for varying the speed of the output shaft member with respect to the input shaft member, a first hydraulic unit drivingly connected to one of said members, a second hydraulic unit drivingly connected to said control gear, conduit means hydraulically interconnecting said first and second hydraulic units, control means for varying the displacement of one of said hydraulic units to maintain a substantially constant rotor speed, housing means for said generator, said differential and said hydraulic units, means for delivering control fluid to said control means, means for delivering hydraulic fluid to said generator, and a common sump in said housing means for both of said fluids.

2. A drive and generator combination as defined in claim 1, including a single scavenge pump in said housing means for scavenging fluid from said common sump.

3. A drive and generator combination as defined in claim 1, including a single charge pump in said housing means for supplying said fluid to said control means and to said generator.

4. A drive and generator combination as defined in claim 3, including means for supplying lubrication fluid to said differential, said charge pump being connected to supply said lubrication fluid to the differential.

5. A drive and generator combination as defined in claim 1, wherein said means for supplying fluid to said generator includes means for supplying cooling hydraulic fluid in direct contact with said stator.

6. A drive and generator combination as defined in claim 1, wherein said means for supplying fluid to said generator includes means for supplying cooling hydraulic fluid in direct contact with said rotor.

7. A drive and generator combination as defined in claim 1, wherein said housing means includes a reservoir hydraulically separate from said sump and adapted to contain fluid to be supplied to both the drive and the generator, a single charge pump for receiving fluid from said reservoir and for conveying the fluid to the control means and said generator.

8. A drive and generator combination as defined in claim 7, including a scavenge pump in said housing means for delivering fluid from said common sump to said reservoir.

9. A drive and generator combination, comprising: a generator having a stationary stator and a rotor adapted to be driven at a substantially constant speed, a constant speed drive for driving the rotor including an input shaft member adapted to be driven by a prime mover, an output shaft member connected to drive the rotor, differential gearing between the input and output shaft members including a control gear for varying the speed of the output shaft member with respect to the input shaft member, a first hydraulic unit drivingly connected to one of said members, a second hydraulic unit drivingly connected to said control gear, conduit means hydraulically interconnecting said first and second hydraulic units, control means for varying the displacement of one of said hydraulic units to maintain a substantially constant rotor speed, said differential including a gear carrier in line with said input shaft member and with said output member, said control gear being in line with said input shaft member and said output shaft member, said output shaft member being directly connected to said rotor thereby eliminating the necessity for drive gearing between the differential output member and the rotor.

10. A drive and generator combination as defined in claim 9, including a third hydraulic unit drivingly connected to said one shaft member, a fourth hydraulic unit drivingly connected to said control gear, second conduit means interconnecting the third and fourth hydraulic units, second control means for varying the displacement of at least one of said third and fourth hydraulic units, said first and second hydraulic units being in back-to-back relation and offset with respect to the axis of said input and output shaft members, said third and fourth hydraulic units being in back-to-back relation and offset with respect to said input and output shaft members.

11. In an integrated constant speed drive and generator, the combination, comprising: a generally cylindrical generator housing open at one end, a generally cylindrical drive housing open at one end, means for attaching the two housings in end to end relationship with the apertured and open ends adjacent each other, a generator in the generator housing including a stator stationarily mounted in the housing, and a rotor mounted for rotation within the stator, an input shaft mounted in one of the housings, a mechanical differential including input gearing adapted to be driven by the input shaft, output gearing adapted to drive the generator rotor, and control gearing adapted to vary the speed ratio of the output gearing to the input gearing, a hydrostatic transmission in the constant speed drive housing including a pair of rotary axial piston hydraulic units connected in closed hydraulic circuit, means for varying the displacement of at least one of the hydraulic units, means connecting one of the hydraulic units to be driven by the input shaft, and means connecting the other hydraulic unit to drive the control gearing in the differential, means responsive to the speed of the output gearing for controlling the displacement-varying means so that the output gearing and generator are driven at a constant speed regardless of variation in speed of the input shaft, a reservoir in the constant speed drive housing, a charge pump communicating with the reservoir for supplying control fluid to the constant speed control, conduit means communicating with the charge pump for lubricating the differential gearing, conduit means communicating with the charge pump for cooling the generator, means for collecting leakage, lubricating and cooling fluid, and a scavenge pump in communication with the collecting means for delivering fluid from the collecting means to the reservoir.

12. A drive and generator combination, comprising: a generator having a stationary stator and a rotor adapted to be driven at a substantially constant speed, a constant speed drive for driving the rotor including an input shaft member adapted to be driven by a prime mover, an output shaft member connected to drive the rotor, differential gearing between the input and output shaft members including a control gear for varying the speed of the output shaft member with respect to the input shaft member, a first hydraulic unit drivingly connected to one of said members, a second hydraulic unit drivingly connected to said control gear, conduit means hydraulically interconnecting said first and second hydraulic units, control means for varying the displacement of one of said hydraulic units to maintain a substantially constant rotor speed, a charge pump in said housing means for supplying control fluid to said control means, passage means in said housing means for supplying cooling fluid to said generator, said passage means being connected to receive cooling fluid from said charge pump, said passage means including integrally molded axial passage means in said housing means directly communicating with the generator stator.

13. A drive and generator combination, comprising: a generator having a stationary stator and a rotor adapted to be driven at a substantially constant speed, a constant speed drive for driving the rotor including an input shaft member adapted to be driven by a prime mover, an output shaft member connected to drive the rotor, differential gearing between the input and output shaft members including a control gear for varying the speed of the output shaft member with respect to the input shaft member, a first hydraulic unit drivingly connected to one of said members, a second hydraulic unit drivingly connected to said control gear, conduit means hydraulically interconnecting said first and second hydraulic units, control means for varying the displacement of one of said hydraulic units to maintain a substantially constant rotor speed, a charge pump in said housing means for supplying control fluid to said control means, passage means in said housing means for supplying cooling fluid to said generator, said passage means being connected to receive cooling fluid from said charge pump, and shaft means supporting said rotor, said passage means including first passage means extending radially in said rotor shaft means and adapted to directly apply cooling fluid to said rotor.

14. A drive and generator combination, comprising: a generator having a stationary stator and a rotor adapted to be driven at a substantially constant speed, a constant speed drive for driving the rotor including an input shaft member adapted to be driven by a prime mover, an output shaft member connected to drive the rotor, differential gearing between the input and output shaft members including a control gear for varying the speed of the output shaft member with respect to the input shaft member, a first hydraulic unit drivingly connected to one of said members, a second hydraulic unit drivingly connected to said control gear, conduit means hydraulically interconnecting said first and second hydraulic units, control means for varying the displacement of one of said hydraulic units to maintain a substantially constant rotor speed, a charge pump in said housing means for supplying control fluid to said control means, passage means in said housing means for supplying cooling fluid to said generator, said passage means being connected to receive cooling fluid from said charge pump, and means freely communicating the generator and the differential and hydraulic units whereby the environment for the generator is the same as the environment for the differential and hydraulic units.

15. A drive and generator combination, comprising: a generator having a stationary stator and a rotor adapted to be driven at a substantially constant speed, a constant speed drive for driving the rotor including an input shaft member adapted to be driven by a prime mover, an output shaft member connected to drive the rotor, differential gearing between the input and output shaft members including a control gear for varying the speed of the output shaft member with respect to the input shaft member, a first hydraulic unit drivingly connected to one of said members, a second hydraulic unit drivingly connected to said control gear, conduit means hydraulically interconnecting said first and second hydraulic units, control means for varying the displacement of one of said hydraulic units to maintain a substantially constant rotor speed, housing means for said generator, said differential and said hydraulic units, a rotor shaft carrying said generator rotor, said differential including a first gear and a second gear in addition to said control gear, at least two of said gears being located within said rotor shaft.

16. A drive and generator combination as defined in claim 15, wherein said rotor shaft, said differential and said input shaft are aligned on a common axis.

17. A drive and generator combination as defined in claim 16, wherein said differential includes a first sleeve-shaped ring gear, a second sleeve-shaped ring gear coaxial with said first ring gear, a carrier extending within said ring gears and having two intermeshing pinions thereon, one of said sleeve ring gears being within said rotor shaft, one of said ring gears being stepped and having an external gear thereon, governor means for said control means, and gear means drivingly interconnecting said external gear and said governor means.

18. A drive and generator combination as defined in claim 15, said housing means having bearing means supporting one end of said rotor shaft, second bearing means in said housing means supporting the other end of said rotor shaft, and third bearing means within said rotor shaft for supporting one of said differential gears.

19. A drive and generator combination, comprising: a generator having a stationary stator and a rotor adapted to be driven at a substantially constant speed, a constant speed drive for driving the rotor including an input shaft member adapted to be driven by a prime mover, an output shaft member connected to drive the rotor, differential gearing between the input and output shaft members including a control gear for varying the speed of the output shaft member with respect to the input shaft member, a first hydraulic unit drivingly connected to one of said members, a second hydraulic unit drivingly connected to said control gear, conduit means hydraulically interconnecting said first and second hydraulic units, control means for varying the displacement of one of said hydraulic units to maintain a substantially constant rotor speed, a charge pump for supplying cooling fluid to said generator rotor, first passage means in said generator rotor for carrying cooling fluid in a direction toward the differential and second passage means for carrying cooling fluid from said charge pump to said first passage means.

20. A drive and generator combination as defined in claim 19, including third passage means in said differential for lubricating the same, said first passage means being connected to convey lubricating fluid to said third passage means.

PO-1050
(5/69)

UNITED STATES PATENT OFFICE
CERTIFICATE OF CORRECTION

Patent No. 3,576,143          Dated April 27, 1971

Inventor(s) Stephen S. Baits

It is certified that error appears in the above-identified patent and that said Letters Patent are hereby corrected as shown below:

Column 11, line 71, after "extending", insert:

--axially in said rotor shaft means and second passage means extending--

Signed and sealed this 11th day of January 1972.

(SEAL)
Attest:

EDWARD M. FLETCHER, JR.
Attesting Officer

ROBERT GOTTSCHALK
Acting Commissioner of Patents